March 22, 1960     A. M. HURTER     2,929,655
TRANSPORT VEHICLE FOR AIRCRAFT TERMINALS
Filed Feb. 23, 1956     5 Sheets-Sheet 1
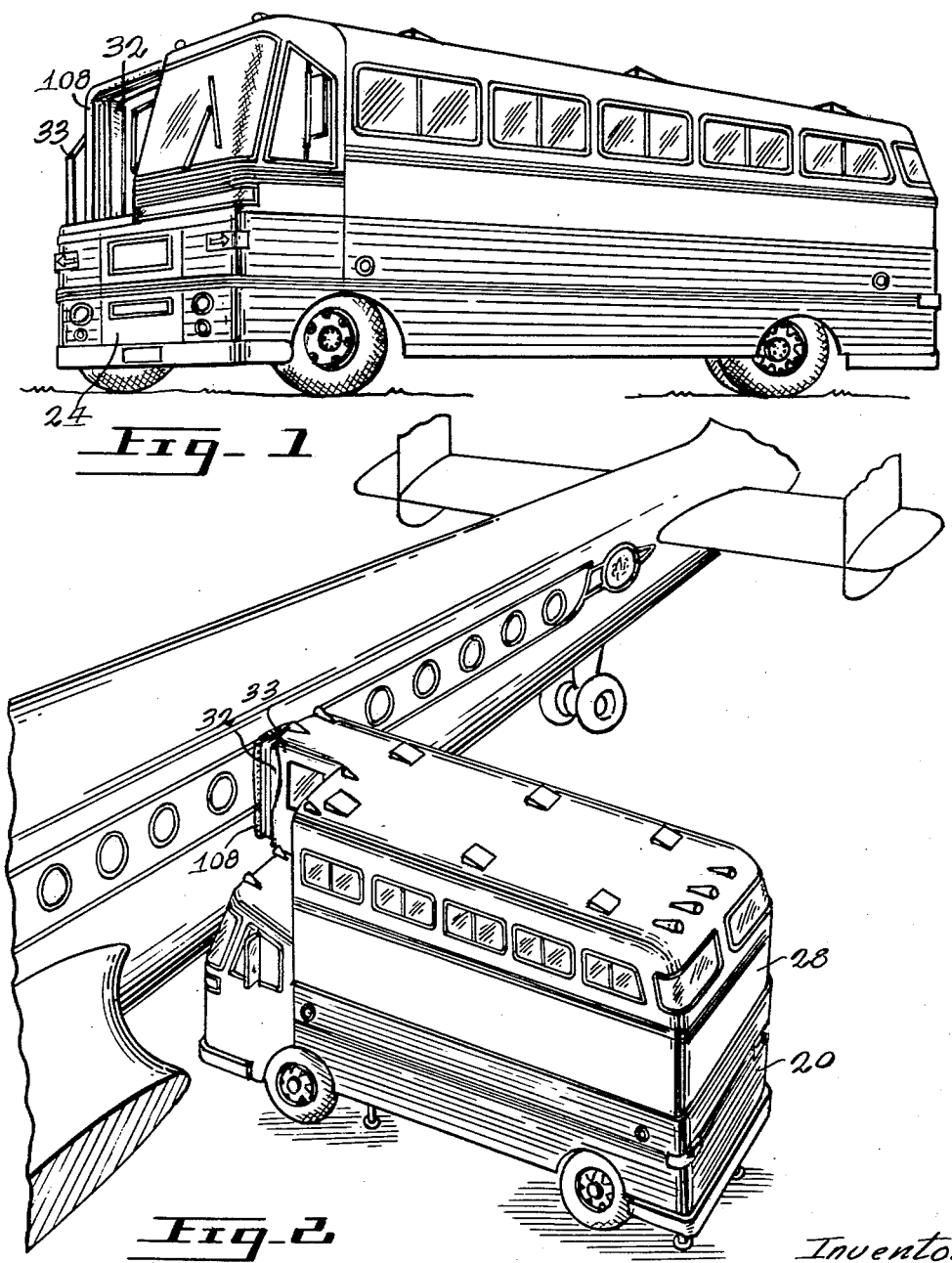
Inventor
ALFRED. M. HURTER
By Alan Swabey
Attorney

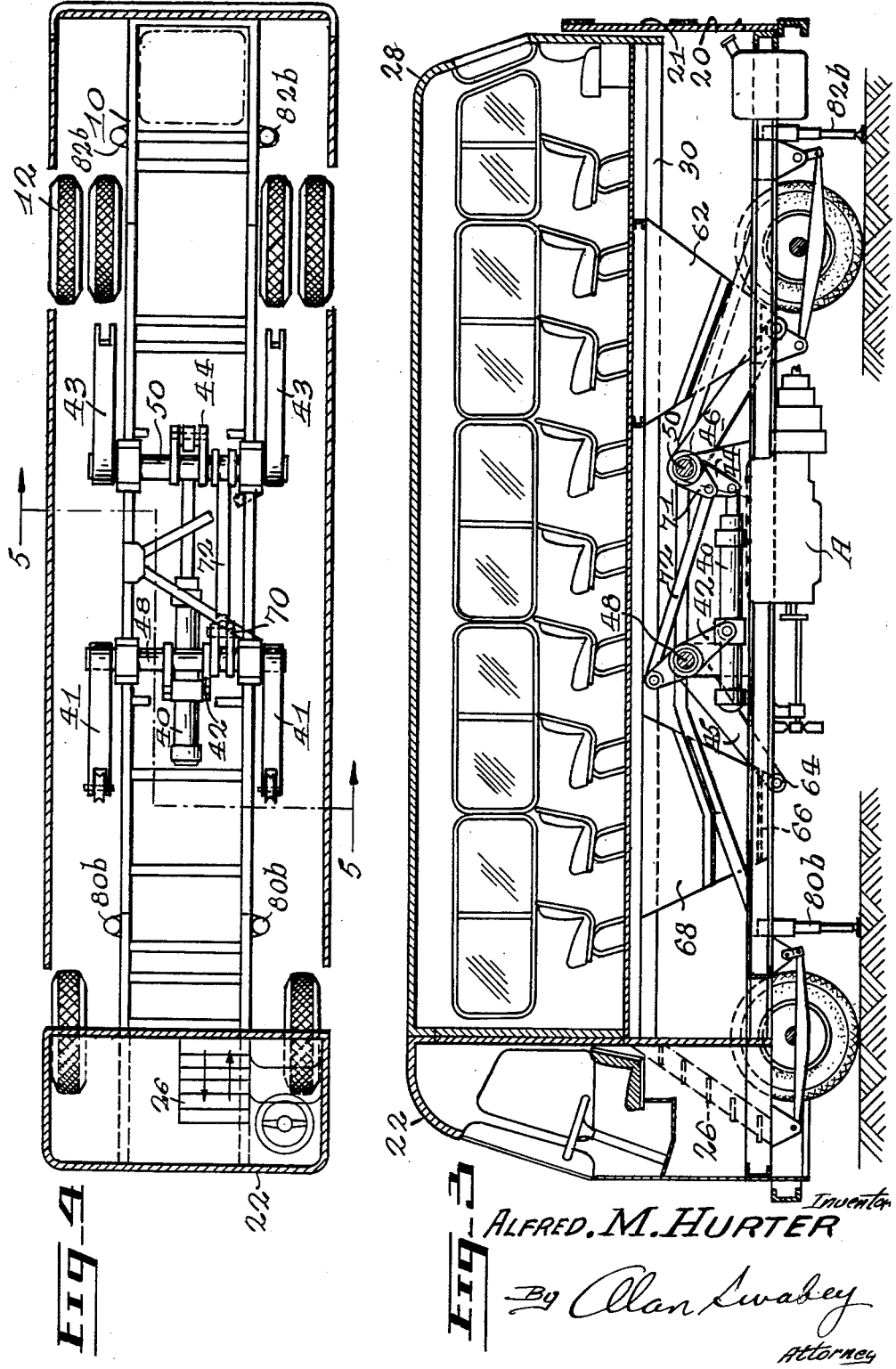

March 22, 1960     A. M. HURTER     2,929,655
TRANSPORT VEHICLE FOR AIRCRAFT TERMINALS
Filed Feb. 23, 1956     5 Sheets-Sheet 3
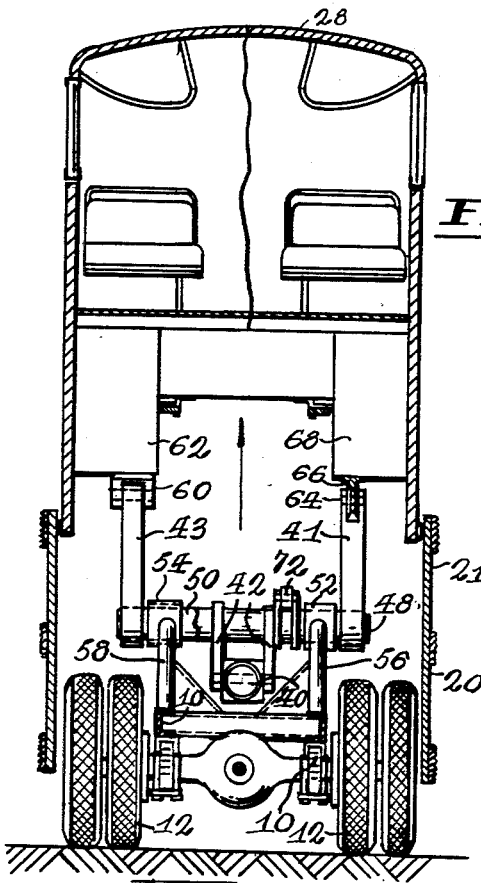
Fig. 5
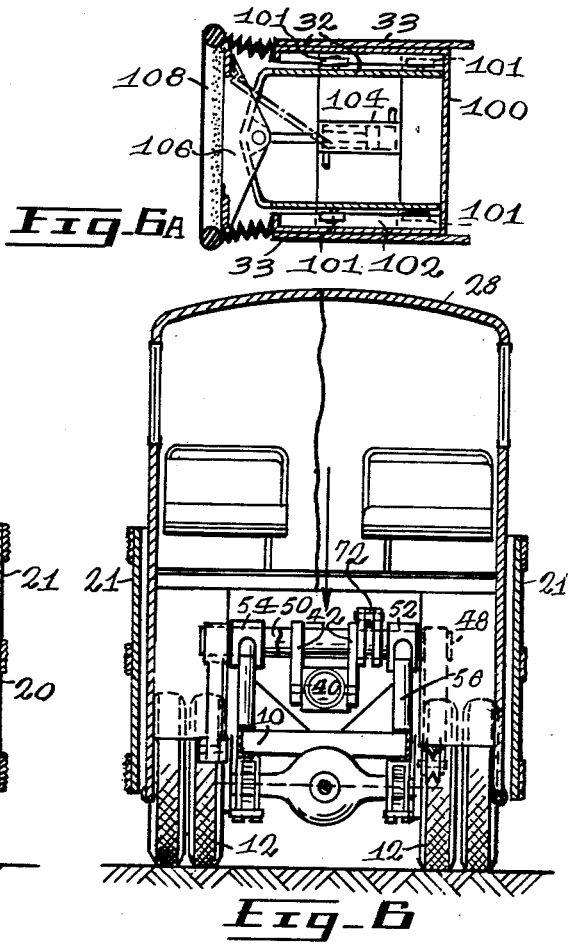
Fig. 6A
Fig. 6
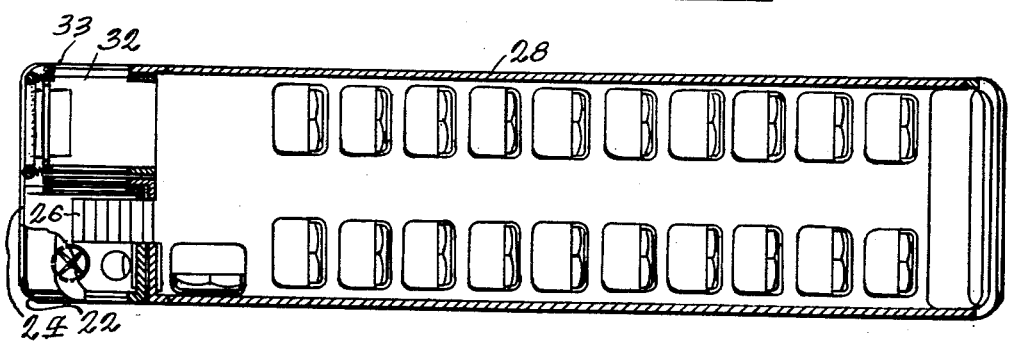
Fig. 7
Inventor
ALFRED M. HURTER
By Alan Swabey
Attorney

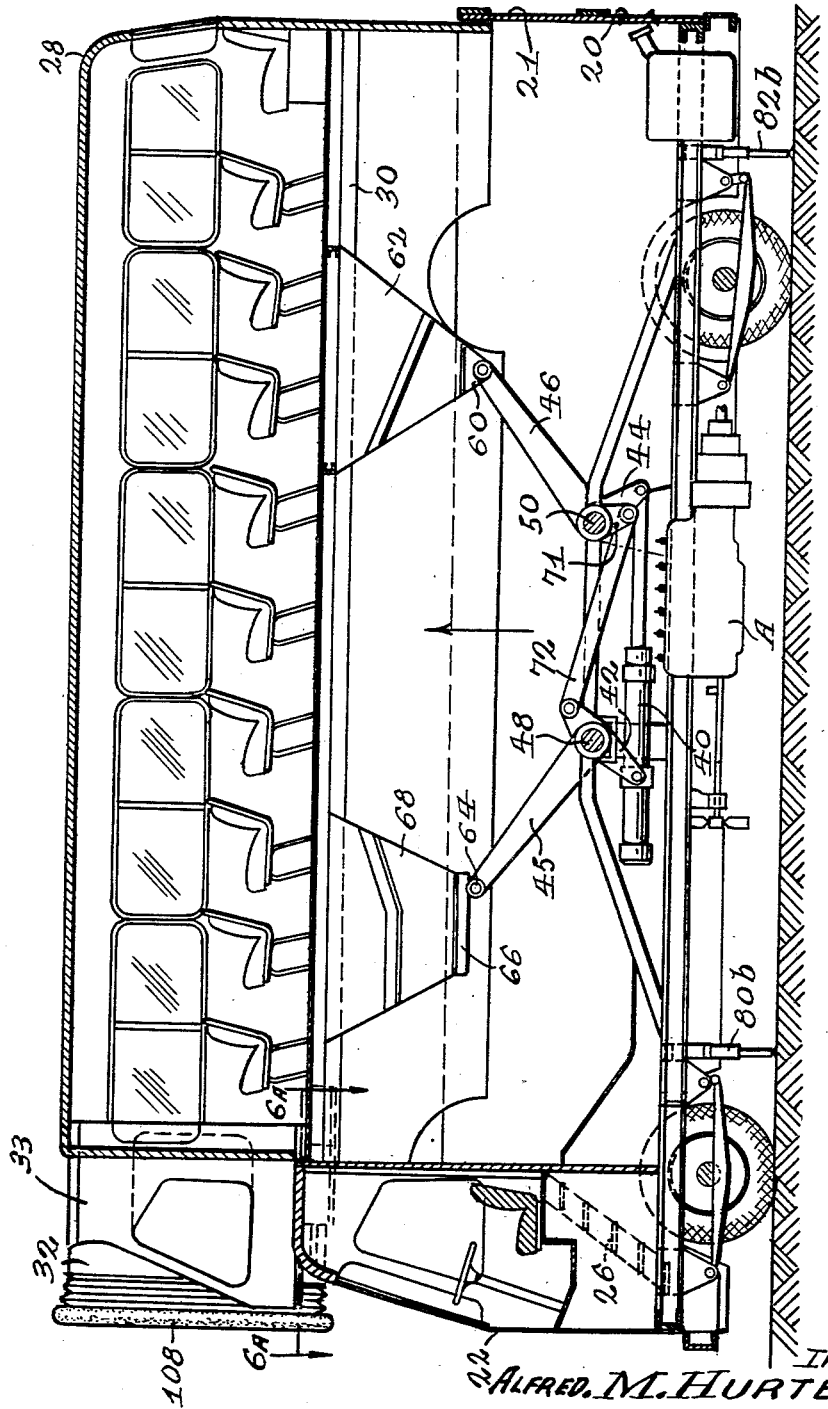

March 22, 1960   A. M. HURTER   2,929,655
TRANSPORT VEHICLE FOR AIRCRAFT TERMINALS
Filed Feb. 23, 1956   5 Sheets-Sheet 5
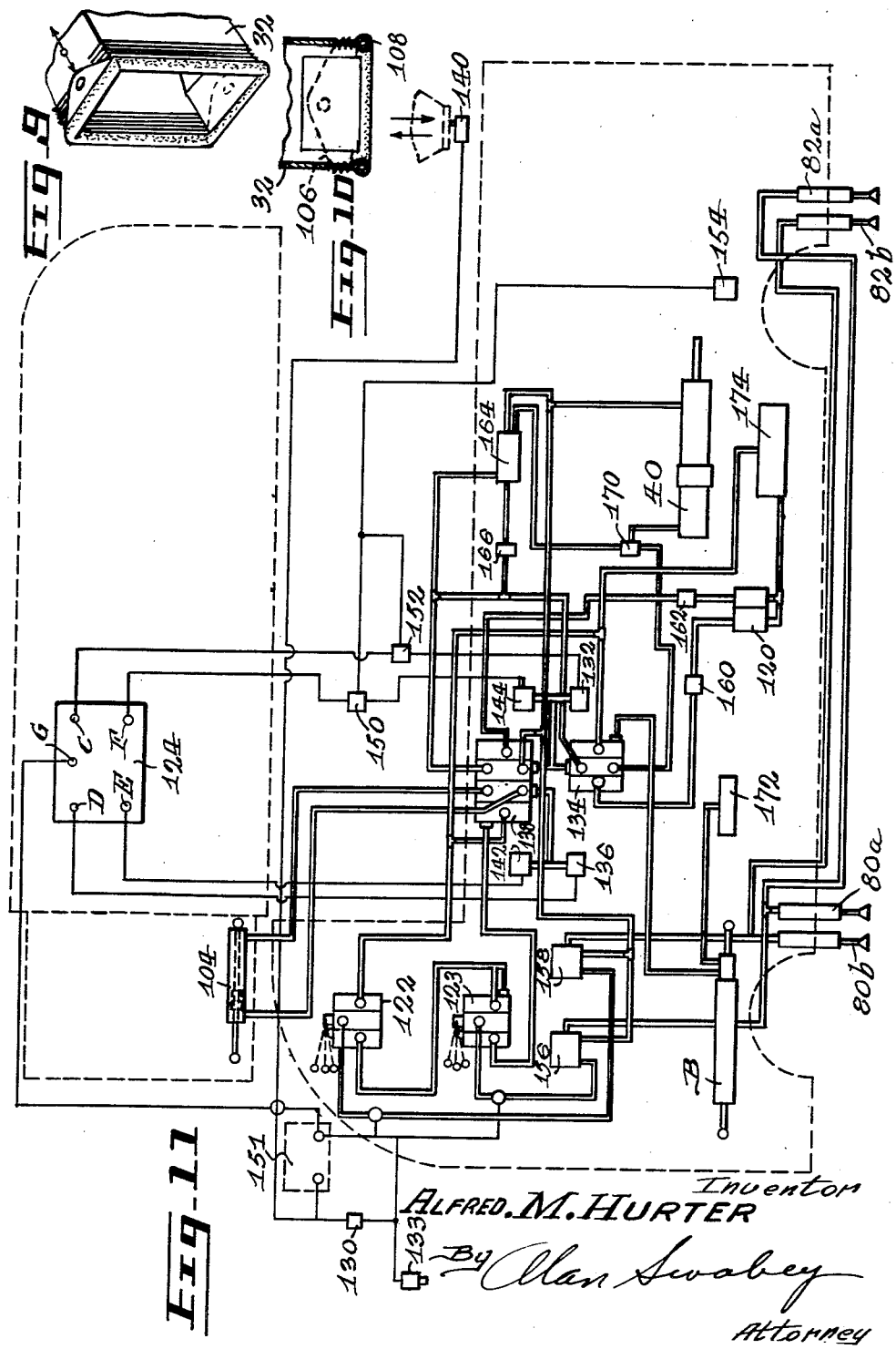

United States Patent Office 2,929,655
Patented Mar. 22, 1960

2,929,655

TRANSPORT VEHICLE FOR AIRCRAFT TERMINALS

Alfred M. Hurter, Lakeside, Quebec, Canada

Application February 23, 1956, Serial No. 567,310

2 Claims. (Cl. 296—28)

The present invention relates to the construction of vehicles adapted to transport passengers and more particularly to the construction of airport transfer buses.

At the present time, the trend of modern aircraft is towards larger and heavier machines so that landing strips and taxi strips have to be built wider and more strongly reinforced to withstand the increasing load. Also, in view of the increased size of aircraft, in general, the landing and take-off strips have to be located far enough away from airport buildings or surrounding obstructions to provide the necessary safety clearances.

The general practise at the present time is to taxi the aircraft to the loading area and then to the starting point of the runway. This practise, even at reduced speeds, consumes fuel, and as the loading area is necessarily restricted to a comparatively small space, the landing and take-off times are considerably increased. This is especially objectionable in busier airports where aircraft must land and take off with the minimum loss of time.

The present general practise of loading and unloading passengers necessitates the use of long terminal buildings so at least two aircraft can stand side by side on the apron. This requires at least a free space of some 500 feet for either plane to move in or out without interference. The crowding of the aircraft on the apron and their nearness to the terminal enhances the possibility of fire so that protective measures must be taken by providing at least one fire wagon close to the terminal.

Also, according to the wind direction, aircraft may have to travel considerable distances to and from the terminal loading area, and to the take-off point, all of which takes time and as previously mentioned is fuel consuming.

In most airports passengers now have to walk from the waiting room in the terminal building to the plane out on the loading area, a distance which is anywhere between 100 and 300 feet or more, and then have to ascend a flight of stairs or steps to reach the aircraft door which, is sometimes as high as ten feet above the ground. In cold, windy and rainy weather or snow, as well as on very hot days, this method of loading is most objectionable.

These problems will grow increasingly worse with the common use of aircraft utilizing jet engines. When aircraft of this nature are utilized, they will have to be towed to the loading area in front of the terminal building, and once boarded by the passengers towed back to the point of take-off. This towing operation will be necessary due to the fact that jet type engines are tremendous fuel consumers so that taxiing would not be economical. The other very serious reason is that the blast and heat from the exhaust of a jet engine would most certainly constitute a danger both to the passengers and a fire hazard if planes of this nature were to taxi close to the terminal.

The present invention recognizes these problems and aims to provide a vehicle for transporting the passengers in comfort directly to the aircraft and also providing means on the vehicle whereby the passengers are raised to a suitable height to correspond with the passenger door heights of various types of aircraft. This of course means that a considerable saving can be effected in the cost of airport terminal buildings as well as providing the maximum of comfort and safety to the passengers. Modern airport terminal buildings, with the many long ramps and widespread design necessary due to the space requirements of modern aircraft are very costly structures. If a transit vehicle according to the present invention is utilized the aircraft terminal can be one compact building resulting in a considerable saving in construction costs and subsequent maintenance.

Accordingly, the invention is an airport transit vehicle which includes in combination a main chassis provided with the usual wheels and a prime mover adapted to actuate certain of the wheels, a lower body including a driver's cab and spaced apart side walls extending from the driver's cab to the rear of the vehicle, and an upper load carrying body having a floor, upright, side and end walls and a roof constituting a passenger enclosure mounted on the chassis between the side walls of the lower body. Means, preferably in the form of a system of bell cranks are provided between the chassis and the upper body and a hydraulic cylinder is mounted on the chassis and is utilized to actuate the bell cranks whereby the upper body can be raised or lowered as desired.

In the preferred construction, the prime mover or propulsive power is through a horizontal type diesel engine suspended beneath the chassis providing the motive power for both propulsion and hoisting of the upper body.

Preferably, the passenger containing enclosure must have sufficient capacity to accommodate in one trip all the passengers which can be carried by the aircraft. In most aspects, the upper and lower body of the bus and the chassis is of a standard type in general with modifications being made in accordance with the present invention.

The upper body is provided with an access door which is located at a forward extension of the upper body which, when in normal position is disposed at the front of the vehicle in juxtaposed relationship with the driver's cab. This access door is provided with a hydraulically operated extension so that when the bus is moved out to the landing strip and the upper body has been raised to align with the opening in the aircraft, the extension can be brought forward so as to form an enclosure leading directly from the interior of the upper body of the bus to the interior of the aircraft.

In the preferred construction, when the upper passenger carrying body is in the lowered position its side skirts which depend below the floor level enclose the automotive and hoisting gears and in the raised position the side walls of the lower body screen the hoisting and driving mechanism so as to present the maximum safety protection.

Having thus generally described the nature of the invention, particular reference will be made to the accompanying drawings, wherein there is shown by way of illustration a preferred embodiment of an airport passenger transit vehicle constructed in accordance with the present invention, and in which:

Figure 1 is a diagrammatic view, in perspective elevation of a preferred embodiment of a transit vehicle in accordance with the present invention.

Figure 2 is a diagrammatic view of the vehicle construction shown in Figure 1 as it would appear in operating position adjacent to an aircraft.

Figure 3 is a sectional view of the vehicle shown in Figure 1 showing the upper bus body in the lower terminal position.

Figure 4 is a view in plan of the lower chassis and bell crank lifting arrangement.

Figure 5 is a transverse cross sectional view of the bus construction shown in Figure 1 to illustrate in more detail the relative position of the chassis bell cranks and upper body, in the raised position, the section being diagrammatic and along the lines 5—5 of Figure 4.

Figure 6 is a diagrammatic cross sectional view corresponding to Figure 5 with the upper passenger carrying body shown in lowered position.

Figure 6A is a sectional view of the construction shown in Figure 8 along the line 6A—6A to illustrate the arrangement of the passenger exit extension more clearly.

Figure 7 is a sectional view in plan of a diagrammatic lay-out of an airport transit vehicle according to the invention with the roof removed to show the seating arrangement in more detail.

Figure 8 is an enlarged cross sectional view corresponding to Figure 3 with the upper passenger carrying body shown in raised position.

Figure 9 is an enlarged fragmentary view of the front portion of the passenger exit extension.

Figure 10 is a plan view of the construction shown in Figure 9 to illustrate in more detail the pivoting arrangement.

Figure 11 is a diagrammatic lay-out of the hydraulic system operating the lifting bell cranks and stabilizing jacks.

With particular reference to the drawings, an airport passenger transit vehicle in accordance with the present invention is preferably constructed to provide comfortable accommodation for approximately 45–48 passengers with baggage, a driver, an operator and two or three baggage crew members. Approximately 44–48 people is the full complement of most of today's aircraft.

As will be apparent from the present drawings, the vehicle design follows conventional passenger bus construction and uses standard automotive equipment wherever possible. It will be understood that other and varied types of vehicle constructions might be employed and modified to incorporate the main features of the present construction illustrated.

In the present construction, the main chassis or frame 10 is provided with the usual springs and the like and is provided with wheels 12 mounted on conventional bus front and rear axles which support the chassis.

In the preferred construction, a horizontal type diesel engine "A" is suspended from the chassis providing the motive power for both propulsion and hoisting as will be described in more detail later.

The lower body 20 is mounted on the chassis 10 and includes a cab 22 having a full vision windshield and the usual driver equipment and is provided with an access door 24 leading from the front of the vehicle. A stairway 26 leads from the access door up to the passenger compartment and sliding doors are provided between the cab and the passenger compartment.

The upper body 28 constituting the passenger compartment is mounted on a steel chassis 30 and can be raised or lowered relative to the lower body 20 to suit the passenger door heights of various types of aircraft by means of hydraulic equipment, to be described in detail later.

The upper skirt 21 of the lower body 20 extends above the lower marginal edge of the upper body 28 so that when the upper body is in the raised position the automotive and hoisting equipment is still enclosed as is shown in Figures 2 and 8.

A gangway 32 is provided at the front right hand corner of the upper passenger carrying body 28 by means of which passengers may enter or leave at the same floor level as the passenger compartment. This gangway is mounted for extension or retraction relative to the upper body 28 and is operated hydraulically by an operator as will be described later.

Upper body lifting equipment

Raising or lowering of the upper chassis frame 30 and consequently, the upper bus body 28 is, as previously mentioned, accomplished by hydraulic means. This hydraulic means includes a double acting cylinder 40 which is mounted on the chassis 10 in a horizontal position between and connected to the shorter arms 42, 44 of two large bellcranks 45, 46. The bellcranks 45, 46 are mounted on two spaced apart shafts 48, 50 supported in bearings 52, 54. The bearings 52, 54 are mounted on standards 56, 58 secured to the lower chassis frame 10.

The upper and longer arms 41, 43 of the bellcranks are connected to the chassis or frame 30 of the upper body. The arms 43 of the rear pair of bellcranks 46 are pivotally connected to bearing brackets 60 mounted on extensions 62 of the chassis frame 30. The terminal ends of the bellcrank arms 41 of the front pair of bellcranks 45 are provided with rollers 64 which engage with and are guided by track sections 66 mounted on extensions 68 of the chassis frame.

Short lever arms 70, 71 are mounted on the shafts 48, 50 and are pivotally connected to a tie rod 72 extending between the shafts 48, 50 to ensure equal rotation of the spaced apart bellcranks so as to maintain the upper passenger carrying body level during its travel.

Hydraulic pressure is supplied to the cylinder 40 at a maximum pressure of about 2,000 p.s.i. by a pump driven by the engine "A." The upper limit of travel is reached when the cylinder 40 reaches the end of its stroke. Safety valves then prevent damage to the hydraulic system. Cushioning devices are provided in the cylinder to provide a smooth stop. The lower limit of travel is determined when the upper passenger carrying body rests against the lower chassis.

Hydraulic jacks 80a, 80b, 82a and 82b are provided as connected to the lower chassis 10 behind the front and rear wheels 12 of the vehicle. These can be extended downwards into engagement with the surface on which the bus is resting to stabilize the vehicle against unequal spring and tire deflections due to shifting about of passengers or windloads. The left hand pair 80a, 82a are controlled separately from the right hand pair 80b, 82b, otherwise higher pressures on one side caused by wind would tilt the body due to the flow of hydraulic fluid from one side to the other. The hydraulic jacks 80ab, 82ab, are controlled from the driver's cab.

Extendible gangway

The hydraulically operated gangway 32 is enclosed in sidewalls 33 of similar construction to the body 28 with a suitable cantilever underframe 100 being provided to support roller tracks 102. A hydraulic cylinder 104 is connected to the front portion 106 of the gangway so that it can be extended or retracted as required. Rollers 101 are provided on the gangway 32 which ride on the tracks 102. The forward end of the gangway 32 is provided with a resilient bumper 108 to provide a cushion when contacting the side of the aircraft.

Hydraulic and electrical system

The hydraulic and electrical system by means of which the vehicle is controlled is shown diagrammatically in Figure 11.

A hydraulic pump 120 is driven by the motor "A" so as to supply fluid under pressure to the main hydraulic cylinder 40, the hydraulic jacks 80, 82, the gangway actuating cylinder 104 and also to supply the necessary hydraulic pressure to the power steering mechanism indicated at "B."

The main control valves 122, 123 are located in the driver's cab with a control panel 124 located in the upper passenger compartment for easy access to the operator.

In operation, the driver of the vehicle lines it up with the side of the aircraft. Angularity of the vehicle relative to the aircraft is left to the driver's judgment. It should be noted that means are provided whereby the vehicle cannot be moved when the upper passenger carrying body is hoisted. This is accomplished by a safety micro-switch 140 actuated by the movement of the upper passenger carrying body, as will be described in more detail later.

The driver then with engine idling, operates the jacks 80a, 80b, 82a, 82b, through the control valves 122, 123. The extension of the jacks through the action of a pressure switch in the jack hydraulic circuit and connected to the relay 130 operates a magnetic valve 133 to set the air brakes of the vehicle. Through the same circuit indication is made on the control panel that the jacks are set and the circuit is ready for "up" operation.

An operator in the passenger compartment, on receipt of the signal on the control board 124 as indicated at "G," operates a control button "C" which controls a circuit adapted to accelerate the motor "A" driving the hydraulic pumps 120 and also actuates a solenoid 132 which controls the hydraulic valve 134 supplying the cylinder 40. The passenger compartment 28 then rises until the operator releases the control button "C" or the upper limit of travel is reached. The compartment 28 then stops and remains at the selected height. The operator then pushes the control button "D" on the control panel 124 which controls the solenoid 136 operating the valve 138 supplying the gangway cylinder 104.

As soon as the compartment starts to rise the micro switch 140 is operated which also completes the circuit to the air brake valve 133. A visual indication is given to the driver that the raising mechanism is extended and since this is a separate circuit to that made by the driver through the pressure switch in the jack hydraulic circuit it is impossible for the driver to move the vehicle while the compartment is raised.

The reverse procedure is used to retract the gangway and lower the passenger compartment.

By pushing the button "E" on the control board 124 the solenoid 142 is operated to reverse the valve 138 so as to reverse the action of the cylinder 104. The push button "F" operates the solenoid 144 also controlling the valve 134 so as to reverse the action of the cylinder 40 lowering the passenger compartment 28 down into place on the lower main body. As the compartment 28 contacts the micro-switch 140 and through the relay 130 releases the action of the magnetic valve 133 to the control of the driver.

Visual indication of the raising of the compartment and lowering of the hydraulic jacks 80, 82 is provided to the driver on the panel 151.

Operation of the control valves 122, 123 raises the hydraulic jacks from contact with the ground which releases the interlocks and the vehicle can be driven away.

Relays 150, 152 are included in the circuit leading from the control panel 124 and co-operate with the actuation of the control buttons "C," "F" to actuate a solenoid 154 controlling the advance and retarding of the throttle controlling the motor "A" and consequently the drive to the hydraulic pump 120.

Pilot operated check valves 156, 158 are connected in the hydraulic system leading to the jacks 80, 82. Relief valves 160, 162 are connected to the hydraulic system leading to and from the pump 120. A pressure control and check valve 164 are connected in the system leading to the cylinder 40 and a relief valve 166 is positioned between the check valve 164 and the control valves 134, 138. A pilot operated check valve 170 is also placed in the system between the cylinder 40 and the control valve 134. Reservoirs 172 and 174 are provided for the power-steering 'B' and the pressurized fluid from the pump 120.

I claim:

1. An airport transit vehicle comprising in combination, a main chassis, wheels mounted on the chassis, a prime mover adapted to actuate certain of said wheels, a lower body mounted on said chassis, and an upper passenger carrying body mounted on said chassis, load lifting and guiding means mounted on said chassis connected to and supporting said passenger carrying body, said load lifting means comprising a pair of spaced shafts mounted on said chassis, a pair of spaced apart bell cranks mounted on each of said shafts with an arm of each of said bell cranks engaged with said upper passenger carrying body and the other arm connected to a hydraulic cylinder assembly, and means connecting said prime mover to said hydraulic cylinder whereby actuation of said cylinder through said prime mover causes opposed rotation of said shafts and through said bell crank arms raises or lowers said upper passenger carrying body in a horizontal position relative to said chassis.

2. An airport transit vehicle as claimed in claim 1, wherein said lower body includes a forward cab enclosure and spaced apart side walls extending upwardly from said chassis and rearwardly of said enclosure to meet a corresponding end wall extending across the rear of said chassis, said cab enclosure extending across a portion only of the front of said lower body, said upper body having a floor and fixed upright side and end walls constituting a passenger enclosure with said side and end walls extending downwardly beyond said floor a distance substantially equal to the height of said lower body walls, said upper body walls fitting within said lower body walls in telescopic overlapped relationship to totally screen said load lifting means in all positions of said upper passenger carrying body.

References Cited in the file of this patent

UNITED STATES PATENTS

| | | |
|---|---|---|
| 795,350 | Gledhill | July 25, 1905 |
| 1,852,984 | Smith | Apr. 5, 1932 |
| 2,343,261 | Marple | Mar. 7, 1944 |
| 2,379,094 | Maxon | June 26, 1945 |
| 2,400,803 | Barnhart | May 21, 1946 |
| 2,412,158 | Kuehlman | Dec. 3, 1946 |
| 2,438,571 | Maxon | Mar. 30, 1948 |
| 2,466,155 | Conrad | Apr. 5, 1949 |
| 2,555,233 | Hastings | May 29, 1951 |
| 2,617,547 | Pridy | Nov. 11, 1952 |
| 2,764,869 | Scherr | Oct. 2, 1956 |
| 2,778,674 | Attendu | Jan. 22, 1957 |

FOREIGN PATENTS

| | | |
|---|---|---|
| 921,163 | France | Jan. 10, 1947 |